United States Patent
Wang et al.

(10) Patent No.: US 12,011,102 B1
(45) Date of Patent: Jun. 18, 2024

(54) MONITOR SUPPORT APPARATUS FOR POINT-OF-SALE SYSTEM

(71) Applicant: Toshiba Global Commerce Solutions, Inc., Durham, NC (US)

(72) Inventors: Chih-Huang Wang, Taipei (TW); Ya-Hsin Hsiao, Taipei (TW); Chin-Wei Su, Taipei (TW); Li-Wei Liu, Taipei (TW)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 0 days.

(21) Appl. No.: 18/162,362

(22) Filed: Jan. 31, 2023

(51) Int. Cl.
*A47F 9/04* (2006.01)
*F16M 11/06* (2006.01)

(52) U.S. Cl.
CPC ............... *A47F 9/04* (2013.01); *F16M 11/06* (2013.01); *A47F 2009/041* (2013.01); *F16M 2200/024* (2013.01); *F16M 2200/041* (2013.01); *F16M 2200/066* (2013.01)

(58) Field of Classification Search
CPC .. F16M 11/06; F16M 11/10; F16M 2200/024; F16M 2200/041; F16M 2200/066; A47F 9/04; A47F 9/041
USPC ............. 248/514, 131, 185.1, 919–920, 130, 248/284.1, 291.1, 181.1–181.2
See application file for complete search history.

(56) References Cited

U.S. PATENT DOCUMENTS

| | | | | |
|---|---|---|---|---|
| 538,534 A * | 4/1895 | O'Neil | ................. | A47B 23/046 |
| | | | | 403/90 |
| 5,118,058 A * | 6/1992 | Richter | .............. | F16M 11/2014 |
| | | | | 248/278.1 |
| 7,178,771 B2 * | 2/2007 | Richter | ................ | F16M 13/022 |
| | | | | 248/205.8 |
| 8,480,050 B2 * | 7/2013 | Chiasson | ............. | B25H 1/0042 |
| | | | | 248/397 |
| 2007/0080267 A1 * | 4/2007 | Richter | ................ | F16M 11/105 |
| | | | | 248/160 |
| 2007/0090234 A1 * | 4/2007 | Liao | ...................... | F16B 47/006 |
| | | | | 248/127 |
| 2007/0152116 A1 * | 7/2007 | Madsen | ................. | F16M 11/14 |
| | | | | 248/181.1 |

OTHER PUBLICATIONS https://pdf.directindustry.com/pdf/sugatsune-kogyo-co-ltd/hg-ma95a-multi-angle-lockinghinge/16787-787665.html.
https://www.mcmaster.com/locking-hinges/.
https://www.3d24.eu/Pivot-Joint-20x20-with-Locking-/-Clamping-Lever-Slot-/5/6Aluminum-Die-Cast.

* cited by examiner

*Primary Examiner* — Christopher Garft
(74) *Attorney, Agent, or Firm* — Stanek Lemon Crouse & Meeks, P.A.

(57) ABSTRACT

A support apparatus for holding a monitor is disclosed. The support apparatus can include an elongate arm pivotally connected to a support member and configured to couple to the monitor. The elongate arm can be pivotable within a range of motion between first and second mechanical stops, and can include a locking mechanism to lock the elongate arm into a selected pivoting position. The support member can extend between first and second side walls that define the mechanical stops. The support apparatus can include a mounting mechanism comprising receiving slots for securely holding the monitor. The mounting mechanism can allow the monitor to be mounted at various positions and orientations. The support apparatus allows the monitor to be positioned at various angles and heights, providing flexibility and customization in the placement of the monitor.

17 Claims, 6 Drawing Sheets

MONITOR SUPPORT APPARATUS FOR POINT-OF-SALE SYSTEM

BACKGROUND

Point-of-sale (POS) systems are used in a variety of settings, including retail stores, restaurants, and other service establishments, to facilitate transactions between customers and businesses. These systems often include a computer monitor that displays information or guidance during the transaction process. The monitor is typically mounted on a support structure at an appropriate height and angle for viewing by the customer or operator.

Figure 1A:
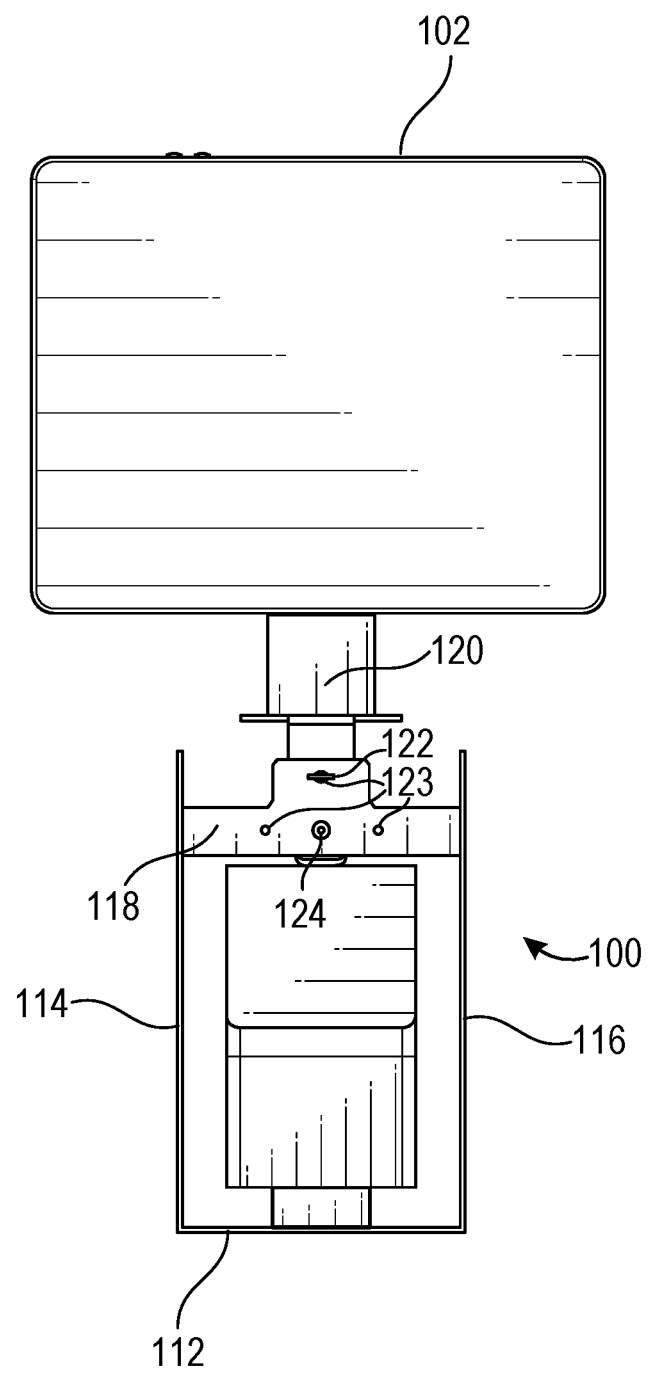
FIG. 1A shows an example support apparatus for holding a monitor in a POS system.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

In the present disclosure, reference is made to a "Point-Of-Sale (POS) system." As used herein, the term "POS system" refers to any system that is used to process transactions at a retail store or other business, including self-checkout (SCO) systems where individuals can scan, pay for, or bag their own items. POS systems are used for a variety of purposes, such as completing sales transactions, processing returns, or handling inquiries. POS systems can be found in a variety of settings, including traditional brick-and-mortar retail stores, online stores, and mobile sales environments.

Disclosed herein is a support apparatus for holding a monitor of a point-of-sale system. The support apparatus includes an elongate arm pivotally connected to a support member at a first end and configured to couple to the monitor at a second end. The elongate arm is pivotable within a range of motion between first and second mechanical stops, such that in a first pivoting position the elongate arm contacts the first mechanical stop and in a second pivoting position the elongate arm contacts the second mechanical stop. The support apparatus can include a locking mechanism to lock the elongate arm into a selected pivoting position, preventing the monitor from being inadvertently moved or repositioned. The support apparatus can include a mounting mechanism at the second end of the elongate arm, allowing the monitor to be securely held in place and easily attached and detached from the support apparatus.

The support apparatus can include a mounting mechanism at the second end of the elongate arm. The mounting mechanism can include a series of spaced receiving slots arranged across perpendicular linear arrays along the mounting mechanism, and the receiving slots can be sized and shaped to securely hold a corresponding protrusion on a back portion of the monitor. The protrusion can be selectively fitted into a selected receiving slot to hold the monitor in place, and the position or orientation of the monitor relative to the mounting mechanism can be adjusted by selecting a different receiving slot and fitting the protrusion into it. This can allow the monitor to be mounted at various positions and angles along at least two axes, providing flexibility and customization in the placement or orientation of the monitor.

This support apparatus offers several advantages in retail and other environments. The pivotable elongate arm, mechanical stops, and mounting mechanism allow the monitor to be positioned at various angles and heights, providing flexibility and customization in the placement of the monitor relative to the customer and/or operator. The mounting mechanism with its receiving slots and locking mechanism provides a secure and adjustable way to hold the monitor in place. The ability to mount the monitor at various positions and angles along at least two axes further enhances the flexibility and customization of the support apparatus. The support apparatus can support left, right, top, or other mounting orientations with only a single arm, making it easy to fit various checkout counters and retail spaces. The locking mechanism can inhibit customers from undesirably adjusting the position or orientation of the monitor, while allowing retail workers to make such adjustments as needed. The mounting mechanism at the second end of the elongate arm can facilitate maintenance and replacement of the monitor as needed. Overall, the support apparatus provides a secure and versatile way to mount a monitor in a point-of-sale system, particularly in retail environments with space or size constraints.

Support Apparatus

FIG. 1A shows an example support apparatus 100 for holding a monitor 102 in a POS system (not shown). The support apparatus 100 offers a reliable and flexible solution for mounting the monitor 102 in the POS system, particularly in retail spaces that may have limited or predefined dimensions. The support apparatus 100 can support a variety of mounting orientations, making it easy to integrate into various checkout counters or retail spaces. For example, it can be configured to fit under or around the self-checkout counter or other surface where it will be placed. Additionally, the support apparatus 100 can be easily installed and removed, allowing it to be used in a variety of different retail environments. It can hold a single monitor 102 or multiple monitors 102.

The support apparatus 100 includes a base member 112, first and second side walls 114, 116, support members 118, an elongate arm 120, and a locking mechanism 122. The elongate arm 120 is pivotally connected to the support members 118 at one end and can be coupled to the monitor 102 at the other end. The elongate arm 120 is pivotable, allowing the monitor 102 to be repositioned as needed. The locking mechanism 122 can secure the elongate arm 120 in place and reduce the possibility of it being inadvertently moved or repositioned, such as by a customer.

Figure 1B:
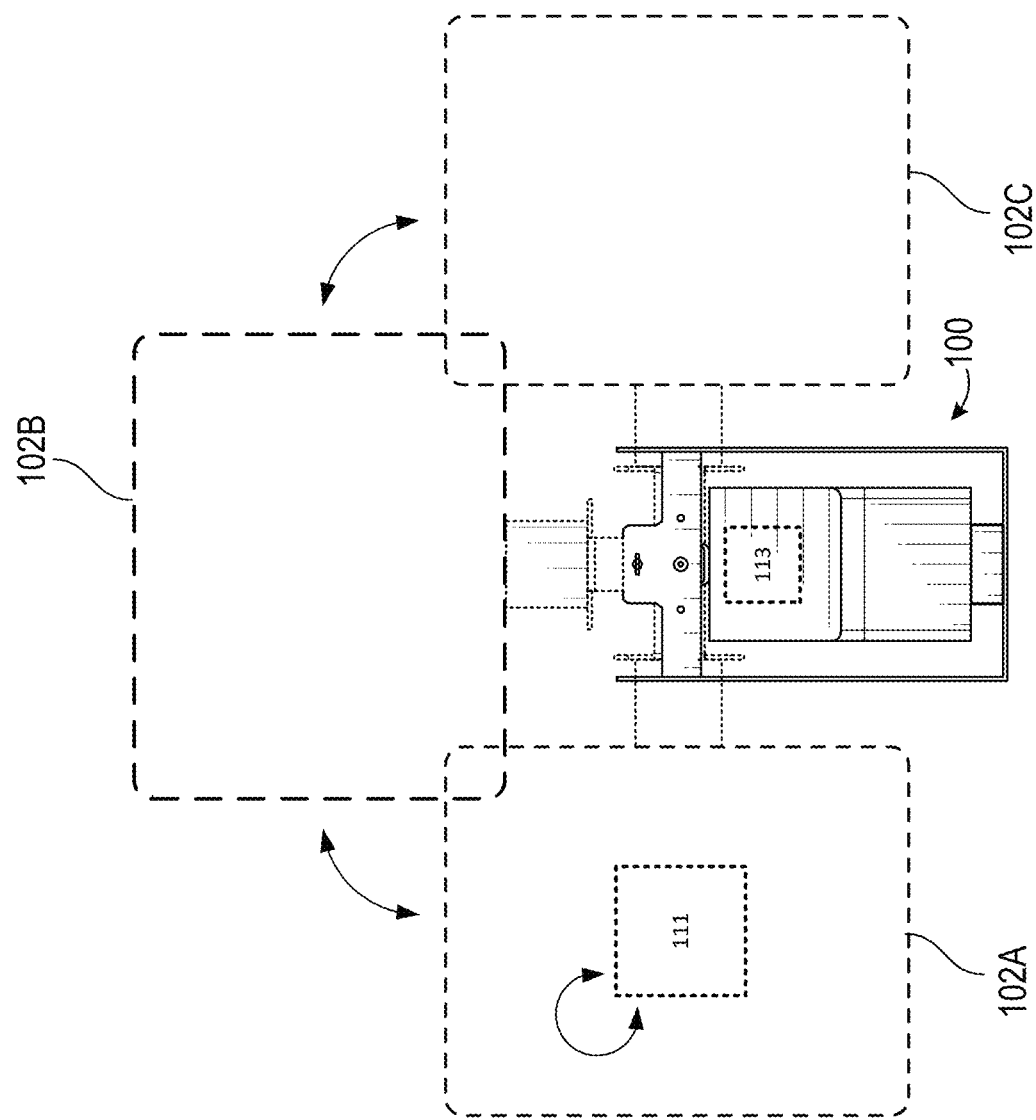
FIG. 1B shows the support apparatus in optional positions.

FIG. 1B shows the support apparatus 100 in optional positions 102A, 102B, 102C. The support apparatus 100 can be mounted on the left (102A), right (102C), top (102B), or in other orientations using a single arm (e.g., elongate arm 120), allowing it to fit into various checkout counters and retail spaces. The support apparatus 100 may include a rotation adjustment mechanism 111 that enables the monitor 102 to be rotated relative to the elongate arm 120, such as to switch between portrait and landscape orientations. It will be appreciated that the number of optional positions may vary across embodiments.

Figure 2B:
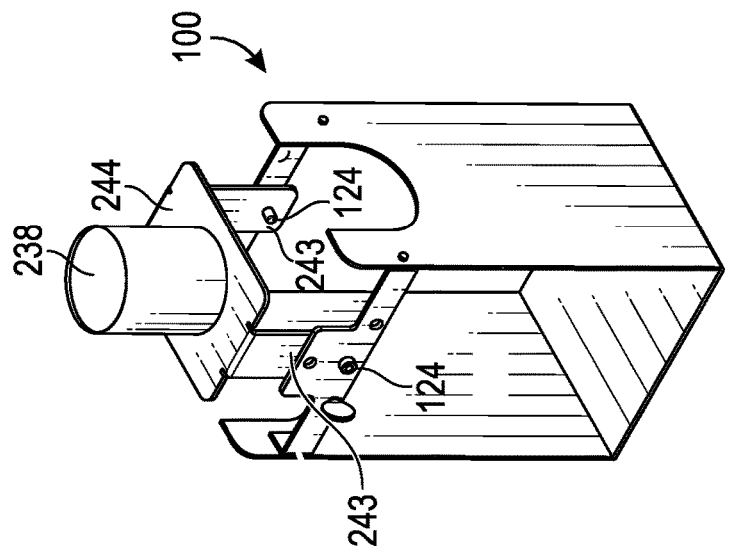
FIG. 2B shows a perspective view of the support apparatus with the monitor and the body portion removed.
Figure 2A:
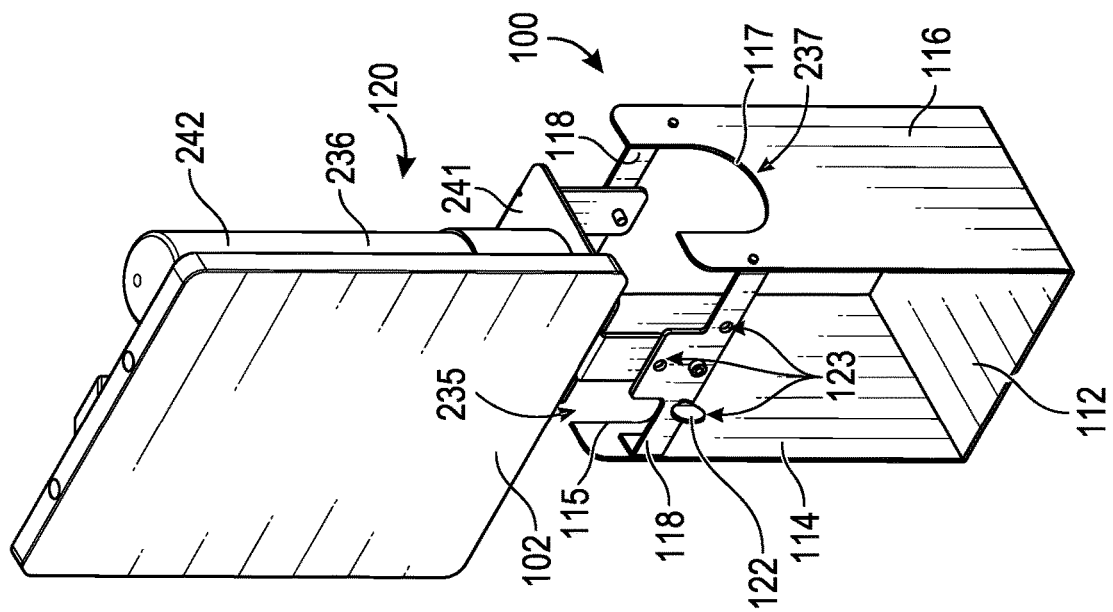
FIG. 2A shows a perspective view of the support apparatus with the monitor attached and the elongate arm oriented in a vertical position.

FIG. 2A shows a perspective view of the support apparatus 100 with the monitor 102 attached and the elongate arm 120 oriented in a vertical position. The base member 112 can include a substantially a flat surface that extends laterally, or horizontally, and can provide a foundation for the support apparatus 100. The base member 112 can be in contact with a bottom surface, such as a table, or raised off the bottom surface. The base member 112 can be made of a strong or durable material, such as metal or plastic, and can have a rectangular or square shape. The thickness of the base member 112 can vary based on the design of the support apparatus 100. The base member 112 may be horizontal, angled, or have a non-flat shape, such as being curved or sloped.

The first and second side walls 114, 116 can extend perpendicularly from opposite ends of the base member 112 and parallel to each other. In some cases, the side walls 114, 116 may not be perfectly perpendicular or parallel. For example, the side walls 114, 116 may be angled or curved relative to the base member 112 or each other. The first side wall 114 can include a first mechanical stop 115, and the second side wall 116 can include a second mechanical stop 117. These mechanical stops 115, 117 can limit the range of motion for the pivotable elongate arm 120. When pivoted, the elongate arm 120 may hit one of the mechanical stops 115, 117, depending on the direction of the pivot.

The mechanical stops 115, 117 can include a respective cutout region 235, 237 with a shape that complements a body 236 of the elongate arm 120. In this example, the shape of the cutout regions 235, 237 is substantially hemispherical. However, the shape of the cutout regions 235, 237 can vary across embodiments and, in some cases, may not be complementary to the body 236 of the elongate arm 120. For example, the cutout regions 235 can be rectangular, square, circular, or have other shapes. The cutout regions 235, 237 can provide a secure and stable fit for the elongate arm 120, reducing wobble or movement when the elongate arm 120 is positioned within them. The cutout regions 235, 237 can be located on the top of the first and second side walls 114, 116, respectively, and can be sized such that the elongate arm 120 is positioned in a substantially horizontal position when in contact with the mechanical stops 115, 117. The first and second side walls 114, 116 can be made of a strong or durable material such as metal or plastic and can have a U- or H-shaped cross section along with the base member 112.

The support members 118 can be located opposite each other and extend between the first and second side walls 114, 116. Although illustrated as two in number, in some cases, the support apparatus 100 may include fewer (e.g., only one) or additional support members. The support members 118 can provide stability for the support apparatus 100 and/or for the elongate arm 120, which may be useful when the elongate arm 120 is holding a heavy monitor 102. The support members 118 can be made of a strong and durable material such as metal or plastic to withstand the weight and pressure of the monitor 102. In some cases, the support members 118 can be adjustable, allowing the distance between the first and second side walls 114, 116 to be changed to accommodate different sizes of elongate arms 120. This can provide greater flexibility in the use of the support apparatus 100 with a variety of elongate arms 120. In other cases, the support members 118 may be fixed in place, providing a fixed and stable support for the elongate arm 120. The support members 118 can also include opposite facing pivot members 124 to pivotably connect to the elongate arm 120, allowing the elongate arm 120 to be repositioned as needed.

The pivot members 124 can include a variety of configurations. For example, they may include a shaft and pin configuration, where a cylindrical shaft on the support member 118 fits within a complementary shaped pin on the elongate arm 120. This allows the elongate arm 120 to rotate around the shaft as needed. Other examples of pivot members 124 may include a ball and socket configuration, where a ball on the support member 118 fits within a socket on the elongate arm 120, allowing for greater range of motion and flexibility in the repositioning of the elongate arm 120. Another example may include a hinge configuration, where the support member 118 includes a hinge mechanism that allows the elongate arm 120 to pivot around it. It will be appreciated that the pivot members 124 can be designed in a variety of configurations. The support members 118 can have various shapes, such as cylindrical, rectangular, or triangular.

The elongate arm 120 is pivotally connected to the support members 118 at a first end and configured to couple to the monitor 102 at a second end. In the illustrated embodiment, the elongate arm 120 includes a bracket 241 coupled to a body portion 242. The bracket 241 and body portion 242 can be integral, or the bracket 241 or body portion 242 may be separate from each other and/or the elongate arm 120. It will be appreciated that the elongate arm 120 may be referred to as including the bracket 241 and the body portion 242, or the bracket 241 or the body portion 242 may be separate from the elongate arm 120.

FIG. 2B shows a perspective view of the support apparatus 100 with the monitor 102 and the body portion 242 removed. As shown, the bracket 241 can be U-shaped and can include a mating interface 238 for mating with an end of the body portion 242. The legs 243 of the bracket 241 can be pivotably coupled to the support members 118 via respective, opposite facing pivot members 124. The base 244 of the bracket 241 can be coupled to the second end of the elongate arm 120. In this example, the bracket 241 moves with the body portion 242 as a unit. The bracket 241 can provide additional stability and support for the elongate arm 120 and the monitor 102. It can be made of a strong and durable material such as metal or plastic. The bracket 241 can be designed to be adjustable, allowing the angle of the elongate arm 120 to be changed to suit the needs of the user.

Referring again to FIG. 2A, the elongate arm 120 is pivotable and can move into a variety of positions within a range of motion extending between the first and second side walls 114, 116, as described herein. The elongate arm 120 can be substantially cylindrical in shape and can be made of a strong and durable material such as metal or plastic. The elongate arm 120 can pivot into a position to the left, right, top of the support apparatus 100, or other position, depending on the needs of the user. In some cases, the elongate arm 120 can be orientated into a horizontal position on either side of the support apparatus 100, or into a vertical position on the top of the support apparatus 100. It will be appreciated that the elongate arm 120 is not limited to a specific range of pivot, and, depending on the embodiment, can pivot into any position within its range of motion, including for example 180 degrees, 90 degrees, less than 180 degrees, more than 180 degrees, or 360 degrees.

The locking mechanism 122 can secure the elongate arm 120 in a selected pivoting position and prevent accidental movement of the monitor 102. In the illustrated embodiment, the locking mechanism 122 includes a series of holes 123 along the elongate arm 120 and a pin that can be selectively inserted into a desired hole 123 to secure the position of the elongate arm 120. However, it will be appreciated that the locking mechanism 122 can vary across embodiments. For example, the locking mechanism 122 can include a lever, button, or any other type of device that can be configured to securely hold the elongate arm 120 in place. In some cases, the support apparatus 100 can include a weight balancing system 113 to evenly distribute the weight of the monitor across the support apparatus 100.

Figure 3B:
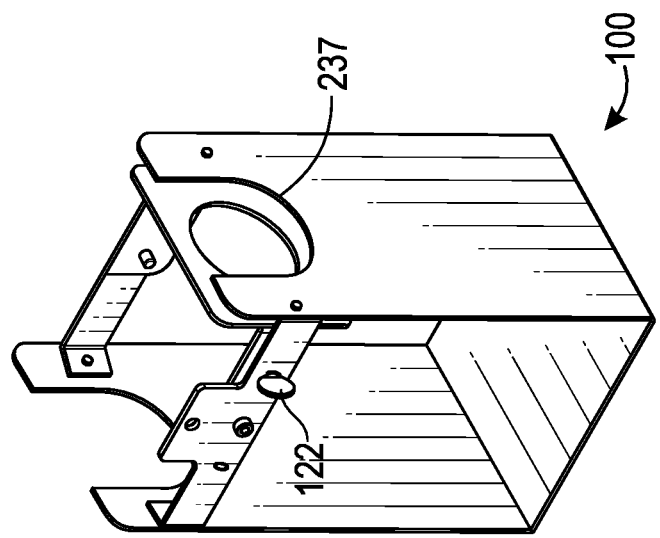
FIG. 3B shows a different perspective view of the support apparatus oriented as in FIG. 3A, but with the monitor and the body portion removed.
Figure 3A:
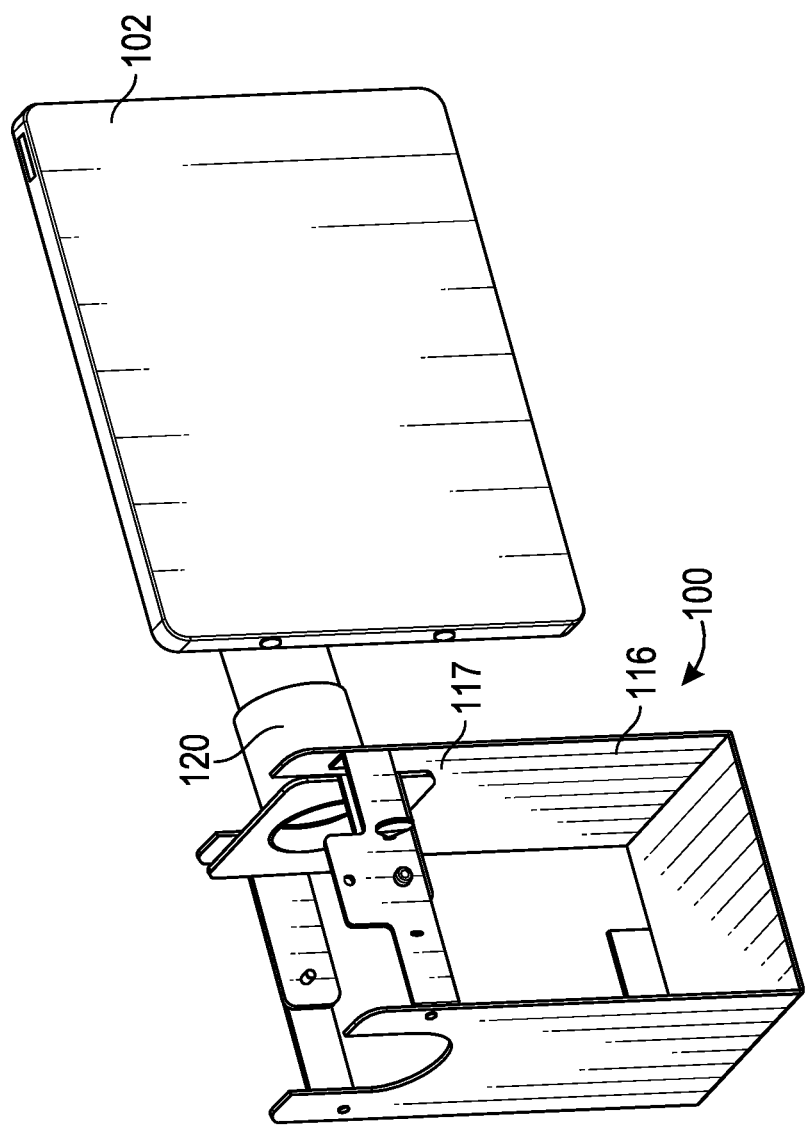
FIG. 3A shows a perspective view of the support apparatus holding the monitor with the elongate arm oriented in a horizontal position on the right side of the support apparatus.

FIG. 3A shows a perspective view of the support apparatus 100 holding the monitor 102 with the elongate arm 120 oriented in a horizontal position on the right side of the support apparatus 100. FIG. 3B shows a different perspective view of the support apparatus 100 oriented as in FIG. 3A, but with the monitor 102 and the body portion 242 removed. In the position shown in FIGS. 3A and 3B, the elongate arm 120 aligns with the cutout region 237 of the second side wall's 116 mechanical stop 117. This illustrates how the support apparatus 100 can be oriented in a variety of different positions to suit the needs of the user. The elongate arm 120 can pivot into a plurality of positions, allowing the monitor 102 to be mounted on the left, right, or top of the support apparatus 100. The locking mechanism 122 can be used to secure the elongate arm 120 in a desired position, preventing accidental movement or detachment of the monitor 102.

Figure 4:
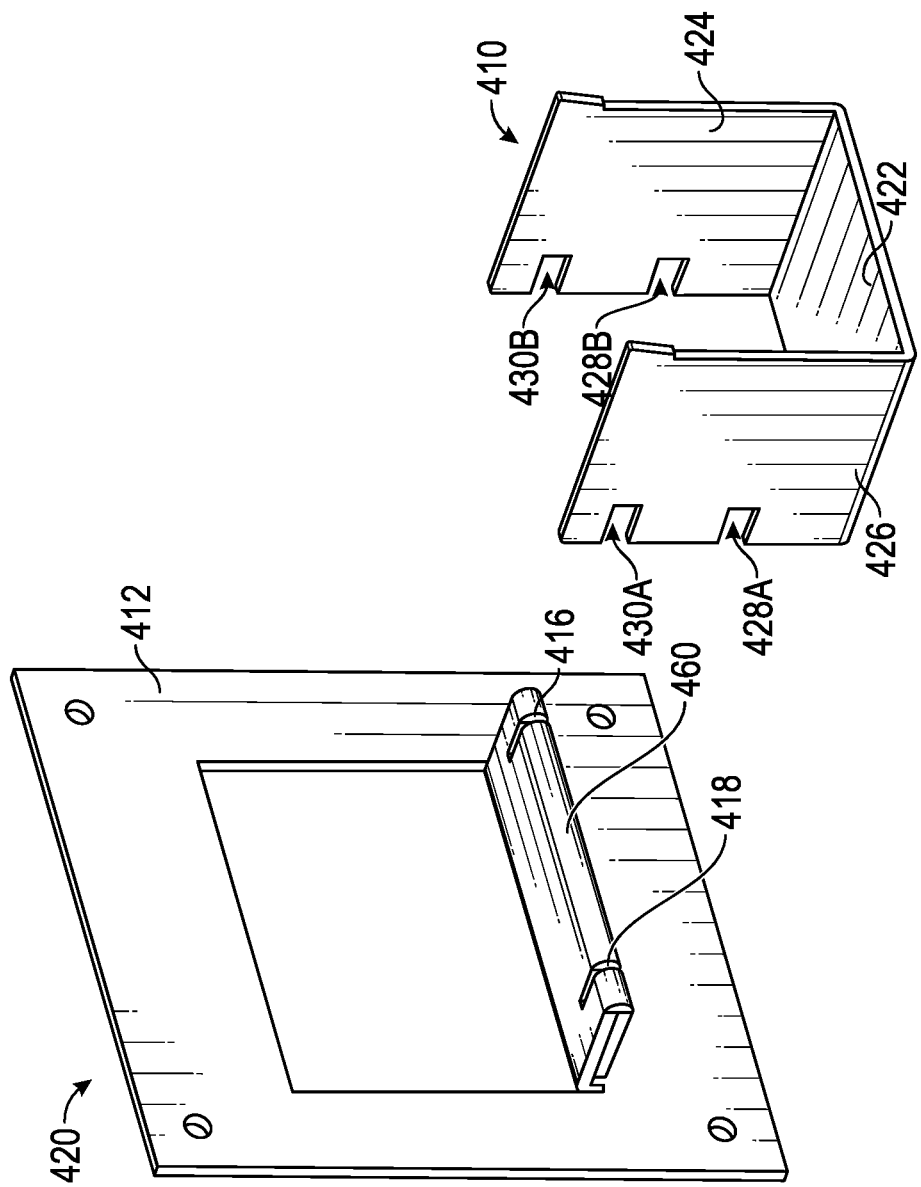
FIG. 4 shows an example set of mounting interfaces for securing the monitor to the support apparatus.

FIG. 4 shows an example set of mounting interfaces 410, 420 for securing the monitor 102 to the support apparatus 100. In some cases, the first mounting interface 410 is coupled to the support apparatus 100, such as to the elongate arm 120, and the second mounting interface 420 is coupled to the back of the monitor 102. In some cases, the second mounting interface 420 is coupled to the support apparatus 100 and the first mounting interface 410 is coupled to the monitor 102.

The first mounting interface 410 can be located at a second end of the elongate arm 120 and can be configured to hold the monitor 102 in place. The first mounting interface 410 includes a series of spaced receiving slots 428A, 428B, 430A, 430B arranged in pairs, such as slot pair 428 (consisting of slots 428A and 428B) and slot pair 430 (consisting of slots 430A and 430B). These receiving slots 428A, 428B, 430A, 430B can be sized and shaped to fit a corresponding protrusion 460 on the back of the monitor 102 (e.g., such as on the second mounting interface 420). By fitting the protrusion 460 into a selected pair of slots, the monitor 102 can be held in place and its position and orientation relative to the first mounting interface 410 can be adjusted by selecting a different receiving slot pair and fitting the protrusion 460 into it. The first mounting interface 410 allows the monitor 102 to be mounted at various positions and angles. In some cases, the receiving slots are spaced across at least two perpendicular linear arrays along the first mounting interface 410, allowing the monitor 102 to be mounted along at least two axes, for example to allow for landscape or portrait configurations. The first mounting interface 410 can include a base 422 and side walls 424, 426.

The first mounting interface 410 can also include a locking mechanism (see e.g., locking mechanism 122 of FIG. 1A) for securing the monitor 102 in place within the selected receiving slot and preventing accidental movement or detachment. This locking mechanism can be a lever, button, or any other device that holds the monitor 102 securely in place. It can be activated by the user when the monitor 102 is in the desired position, and deactivated when the position or orientation of the monitor 102 needs to be changed.

The second mounting interface 420 can include a base 412 and the protrusion 460 extending from the base 412. In some cases, the protrusion 460 includes notches 416, 418 for coupling with the side walls 426, 424 of the first mounting interface 410 when the first mounting interface 410 is coupled to the second mounting interface 420.

Figure 5:
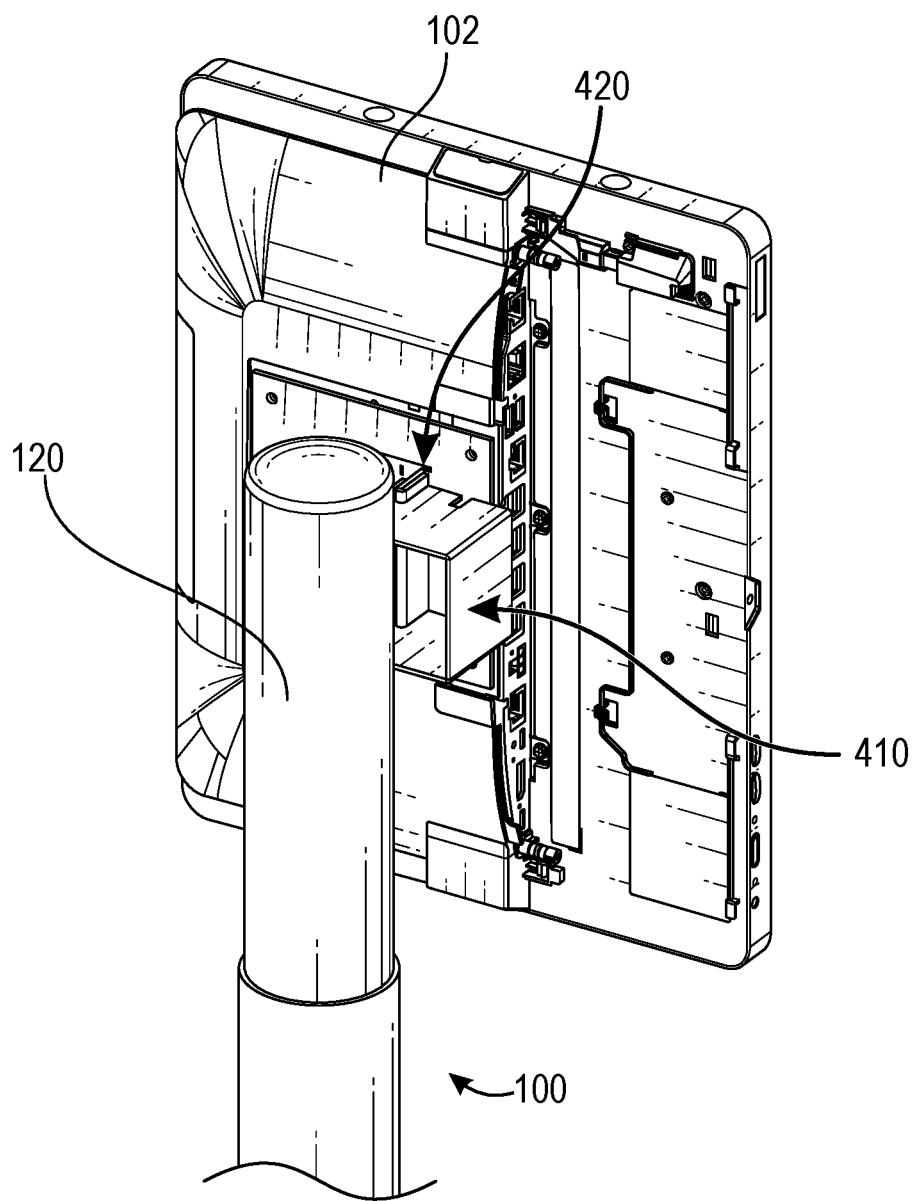
FIG. 5 shows a rear perspective view of a portion of the support apparatus holding the monitor using the mounting interfaces of FIG. 4.

FIG. 5 shows a rear perspective view of a portion of the support apparatus 100 holding the monitor 102 using the mounting interfaces 410, 420 of FIG. 4. The monitor 102 is shown secured to the support apparatus 100 using the mounting interfaces 410, 420. The monitor 102 is attached to the elongate arm 120 at the first mounting interface 410, which is disposed at the second end of the elongate arm 120. The second mounting interface 420 is coupled to the rear of the monitor 102. As described, the position and orientation of the monitor 102 to be adjusted by selecting a different receiving slot and fitting the protrusion into it.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the routines described elsewhere herein can be performed in a different sequence, can be added, merged, or left out altogether (non-limiting example: not all are necessary for the practice of the algorithms). Moreover, in certain embodiments, operations, acts, functions, or events can be performed concurrently, rather than sequentially.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

As used herein, the term "component" is intended to be broadly construed as hardware, firmware, or a combination of hardware and software.

These and other changes can be made to the present disclosure in light of the above Detailed Description. While the above description describes certain examples of the present disclosure, and describes the best mode contemplated, no matter how detailed the above appears in text, the present disclosure can be practiced in many ways. Details of the system may vary considerably in its specific implementation, while still being encompassed by the present disclosure disclosed herein. As noted above, particular terminology used when describing certain features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific examples disclosed in the specification, unless the above Detailed Description section explicitly defines such terms. Accordingly, the actual scope of the present disclosure encompasses not only the disclosed examples, but also all equivalent ways of practicing or implementing the present disclosure under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

What is claimed is:

1. A support apparatus for holding a monitor of a point-of-sale system, the support apparatus comprising:
   a first side wall defining a first mechanical stop;
   a second side wall defining a second mechanical stop;
   a support member extending between the first and second side walls;
   an elongate arm pivotally connected to the support member at a first end and configured to couple to a monitor of a point-of-sale system at a second end, the elongate arm being pivotable within a range of motion extending between the first mechanical stop and the second mechanical stop, such that in a first pivoting position the elongate arm contacts the first mechanical stop and in a second pivoting position the elongate arm contacts the second mechanical stop; and
   a mounting member disposed at the second end of the elongate arm, the mounting member comprising a series of spaced receiving slots along the mounting member, wherein a corresponding protrusion on a receiving system coupled to a back portion of the monitor is selectively fitted into a selected receiving slot of the series of spaced receiving slots to hold the monitor in place.

2. The support apparatus of claim 1, wherein in each of the first and second pivoting positions, the elongate arm is substantially horizontal.

3. The support apparatus of claim 1, wherein the first mechanical stop defines a recess, the recess having a complementary shape to a body of the elongate arm, such that the body of the elongate arm fits within the recess in the first pivoting position.

4. The support apparatus of claim 3, wherein in the first pivoting position, the recess of the first mechanical stop at least partially surrounds the elongate arm to inhibit wobble when the elongate arm is positioned with that interface.

5. The support apparatus of claim 3, wherein the recess is located on a top portion of the first side wall.

6. The support apparatus of claim 3, wherein the body of the elongate arm is substantially cylindrical, and wherein the recess is substantially semicircular.

7. The support apparatus of claim 1, wherein the first and second mechanical stops define identical recesses, the recesses having a complementary shape to a body of the elongate arm, such that the body of the elongate arm securely fits within each recess.

8. The support apparatus of claim 1, wherein the first pivoting position and the second pivoting position are separated by about 180 degrees of rotation of the elongate arm.

9. The support apparatus of claim 1, further comprising a base member that extends in a lateral direction, wherein the first and second side walls extend perpendicularly to and from respective opposite ends of the base member.

10. The support apparatus of claim 9, wherein a cross section of the base member and the first and second side walls traverse to the lateral direction is a U-shape.

11. The support apparatus of claim 1, wherein in a third pivoting position, the elongate arm is vertical.

12. The support apparatus of claim 1, further comprising a locking mechanism to lock the elongate arm into a selected pivoting position, wherein while locked the elongate arm is inhibited from pivoting into a different pivoting position.

13. The support apparatus of claim 1, wherein the support member comprises a pair of opposite facing support members extending between the first and second side walls, wherein the elongate arm is pivotally connected to each of the support members.

14. The support apparatus of claim 13, wherein the second end of the elongate arm is pivotably coupled to the support members via respective, opposite facing pivot members.

15. The support apparatus of claim 1, further comprising a bracket positioned between the elongate arm and the support members, wherein legs of the bracket are pivotably coupled to the support members via respective, opposite facing pivot members, wherein a base of the bracket is coupled to the second end of the elongate arm, and wherein the bracket moves with the elongate arm moves as a unit.

16. The support apparatus of claim 1, wherein the monitor is rotatable relative to the elongate arm between portrait and landscape orientations.

17. The support apparatus of claim 1, further comprising a locking member configured to be removably coupled to the mounting member, the locking member comprising a removable pin configured to secure the monitor in place within the selected receiving slot limit movement or detachment of the monitor.

* * * * *